(12) United States Patent
Venkatasubramanian et al.

(10) Patent No.: US 8,953,716 B1
(45) Date of Patent: Feb. 10, 2015

(54) DC OFFSET ESTIMATION AND COMPENSATON FOR WIDEBAND SYSTEMS

(75) Inventors: GuruGuha Venkatasubramanian, Saligramam (IN); Balasubramanian Ramachandran, Hyderabad (IN)

(73) Assignee: Marvell International Ltd. (BM)

( * ) Notice: Subject to any disclaimer, the term of this patent is extended or adjusted under 35 U.S.C. 154(b) by 106 days.

(21) Appl. No.: 13/611,731

(22) Filed: Sep. 12, 2012

Related U.S. Application Data

(60) Provisional application No. 61/534,631, filed on Sep. 14, 2011.

(51) Int. Cl.
*H03K 9/00* (2006.01)

(52) U.S. Cl.
USPC ............ 375/316; 375/254; 375/285; 375/346

(58) Field of Classification Search
CPC ............................ H03D 3/008; H04L 27/2647
USPC .......................................................... 375/316
See application file for complete search history.

(56) References Cited

U.S. PATENT DOCUMENTS

| 2004/0177691 | A1* | 9/2004 | Kunda et al. | 73/514.35 |
| 2011/0153704 | A1* | 6/2011 | Toraichi et al. | 708/300 |
| 2011/0215857 | A1* | 9/2011 | Nonin | 327/307 |

* cited by examiner

*Primary Examiner* — Lihong Yu

(57) ABSTRACT

Systems, methods, and other embodiments associated with a DC notch gear filter are described. According to one embodiment, an apparatus includes a digital high pass filter having a cutoff frequency and a gear mechanism configured to successively change the cutoff frequency of the high pass filter based on a sequence of cutoff frequencies. The apparatus also includes a direct current (DC) estimator configured to estimate a DC offset of a digital input signal to the high pass filter based, at least in part, on an output signal of the high pass filter as a cutoff frequency is successively changed. A direct current (DC) compensator is configured to subtract the estimated DC offset from the input signal to the high pass filter.

19 Claims, 4 Drawing Sheets

US 8,953,716 B1

DC OFFSET ESTIMATION AND COMPENSATON FOR WIDEBAND SYSTEMS

CROSS REFERENCE TO RELATED APPLICATIONS

This patent disclosure claims the benefit of U.S. Provisional Application No. 61/534,631 filed on Sep. 14, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

With the advent of 3G and 4G technology, which utilize the Code Division Multiple Access (CDMA) channel access method, receivers of wireless devices are kept in an active mode at all times. This means that the receiver must be capable of handling a large, dynamic range of input signals (e.g., wideband receivers). To cope with the dynamic range of signals, front end processing acts on the received radio frequency (RF) signal to increase (or decrease) the strength of the signal into an intermediate range that can be handled by digital signal processing components downstream. Because of the variability of the strength of the input signal, and because of noise considerations, front end processors typically include a plurality of amplifier stages that can be selected according to the strength of the input signal to amplify (or attenuate) the input signal as needed.

SUMMARY

In one embodiment an apparatus includes a digital high pass filter having a cutoff frequency and a gear mechanism configured to successively change the cutoff frequency of the high pass filter based on a sequence of cutoff frequencies. The apparatus also includes a direct current (DC) estimator configured to estimate a DC offset of a digital input signal to the high pass filter based, at least in part, on an output signal of the high pass filter as a cutoff frequency is successively changed. A direct current (DC) compensator is configured to subtract the estimated DC offset from the input signal to the high pass filter.

In another embodiment, a method includes providing a high pass filter having a cutoff frequency and successively changing the cutoff frequency of the high pass filter based on a sequence of cutoff frequencies. The method includes estimating a DC offset of a digital input signal to the high pass filter based, at least in part, on an output signal of the high pass filter, as a cutoff frequency is successively changed. The method also includes subtracting the estimated DC offset from the input signal to the high pass filter.

In another embodiment, an RF receiver includes a front end processor that has a plurality of gain stages configured to amplify a received signal, wherein a gain stage is selected from the plurality of gain stages to process a received signal based on strength of the received signal. When a different gain stage is selected, a DC offset is produced in a signal output by the gain stage. The receiver includes an analog to digital converter (ADC) configured to convert an output of the gain stages into a digital signal. The receiver also includes a DC notch gear filter configured to remove the DC offset by: i) processing the digital signal with a high pass filter having a cutoff frequency; ii) successively changing the cutoff frequency of the high pass filter according to a sequence of cutoff frequencies; iii) estimating a DC offset in a digital input signal of the high pass filter based, at least in part, on the output signal of the high pass filter as the cutoff frequency is successively changed; and iv) subtracting the estimated DC offset from an input signal to the high pass filter. The receiver also includes a baseband processor configured to perform baseband processing on an output of the DC notch gear filter.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

When a different amplifier stage in the front end is selected, a DC offset is created in the output signal. The addition of DC offset is a known phenomena, created due to time delay when a new amplifier stage is activated. The continuous time base band signal after being digitized would have a DC offset. The DC offset can be removed using a high pass filter or DC notch filter which will notch out the DC to improve the quality of the subsequent processing operations. During normal operation of a wireless receiver, the strength of the input signal may vary as the receiver moves relative to the transmitter or as temperature or other environmental conditions change. This means that the gain stages may be switched during operation at any time, introducing a DC offset into the signal produced by the ADC. Quickly compensating for the DC offset facilitates efficient processing of wide band signals. As discussed above, wideband receivers switch amplifier stages more often, which leads to more instances of the DC offset that should be filtered out of the ADC output.

Digital high pass filters may be used to filter out the DC offset in the digital signal. Using a high pass filter with a low cutoff frequency will preserve the quality of the signal, but high pass filters with low cutoff frequencies take a significant time to settle. While a long settling time may be acceptable for voice signal, where the first portion of data may not be necessary to understand the signal, a long settling time may significantly degrade the receiver's performance when processing a data transfer in which each packet contains important information. To decrease the settling time, a high pass filter with a high cutoff frequency might be selected. However, the high cutoff frequency may result in loss of some of the signal data, which would degrade the receiver's performance, especially in data (rather than voice) transfer operations.

Described herein are examples of systems, methods, and other embodiments associated with a DC notch gear filter that speeds the removal of a DC offset in digital signals in wideband systems while preserving signal quality.

Figure 1:
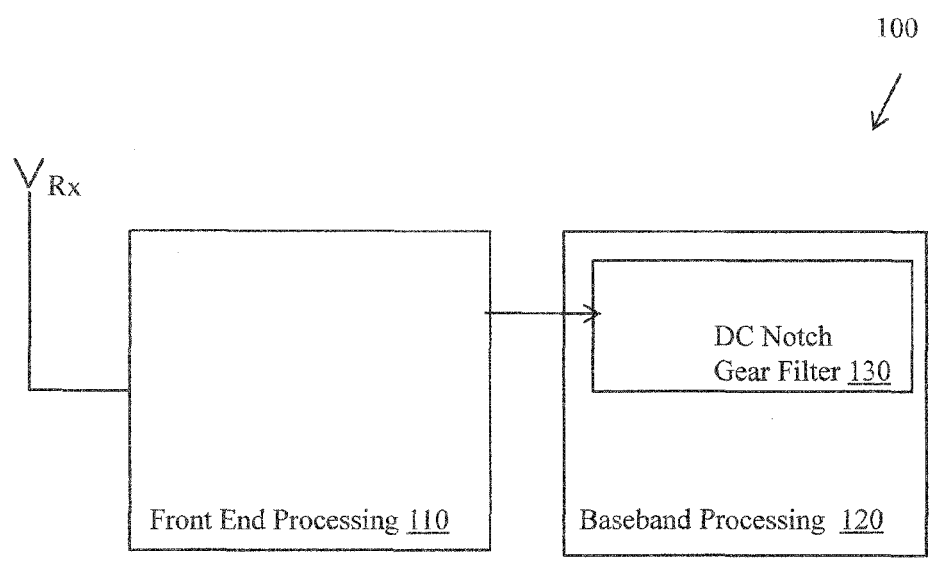
FIG. 1 illustrates one embodiment of an apparatus associated with a direct current (DC) notch gear filter for wideband receivers.

With reference to FIG. 1, one embodiment of a receiver 100 is shown that is associated with a DC notch gear filter for wideband receivers. The receiver 100 may be configured to receive wideband signals including voice and other data over a wide bandwidth. The receiver 100 includes a front end processing unit 110 that performs initial processing on an analog signal received by way of a receiver antenna. As discussed above, the front end processing unit 110 performs amplification and, in some embodiments, noise reduction, on the received signal.

To be capable of processing wideband signals, the front end processing unit includes multiple gain stages, one of which can be selected depending on the strength of a received signal. When the gain stage switches, a DC offset is introduced in the amplified signal. The amplified signal is processed by an analog to digital converter (ADC) and provided to a baseband processing unit 120 that performs additional processing on the signal in the digital domain. The presence of the DC offset in the signal is removed prior to extracting the data in the signal. When the DC offset appears due to a gain change (or any other reason), the offset is removed using a DC notch gear filter 130.

The DC notch gear filter 130 removes the DC offset from the digital signal. As will be described in more detail below, the DC notch gear filter 130 includes a high pass filter having a cutoff frequency that is incrementally changed to quickly remove the DC offset. In one embodiment, the DC notch gear filter 130 starts with a relatively high cutoff frequency to remove a large portion of the DC offset and benefit from a quick settling time. The cutoff frequency is incrementally reduced to gain back signal information that may have been lost with the higher cutoff frequency. This "geared" approach results in a DC notch gear filter that enjoys the benefits of quick reaction time while maintaining signal quality.

Figure 2:
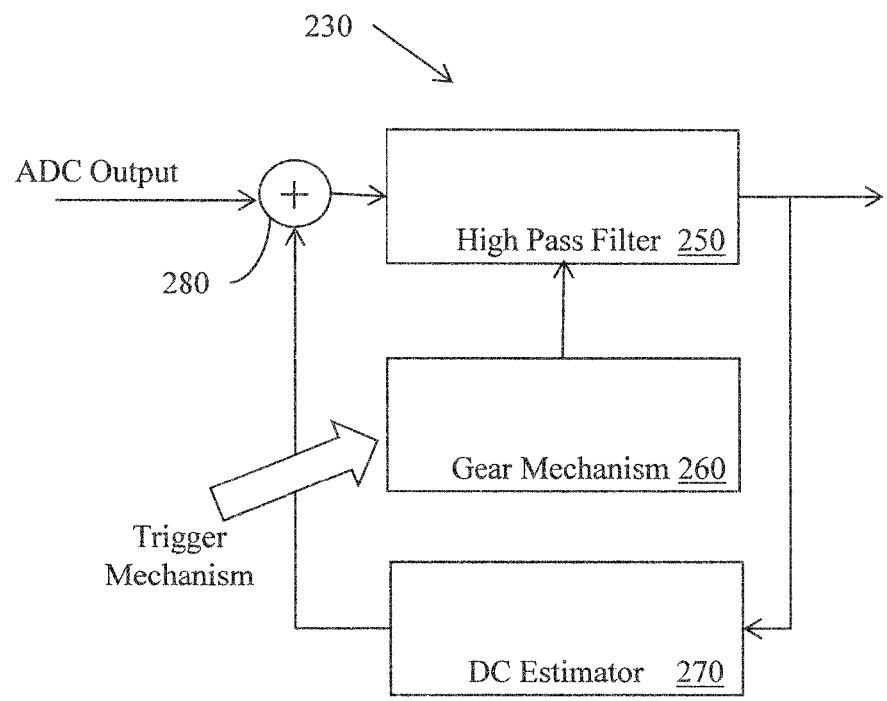
FIG. 2 illustrates one embodiment of an apparatus associated with a direct current (DC) notch gear filter for wideband receivers that includes a trigger mechanism.

FIG. 2 illustrates, in more detail, one embodiment of a DC notch gear filter 230. The DC notch gear filter 230 includes a high pass filter 230 that has a predetermined cutoff frequency. A gear mechanism 260 is operable to successively change the cutoff frequency of the high pass filter according to a predetermined sequence of cutoff frequencies. In one embodiment, the gear mechanism 260 changes the cutoff frequency four times, so that the high pass filter acts on the input signal with five different cutoff frequencies.

Decreasing the cutoff frequency incrementally yields effective filtering with acceptable settling time and signal preservation. The gear mechanism 260 may proceed in different ways through the sequence of cutoff frequencies. In one embodiment, the gear mechanism 260 changes the cutoff frequencies at predetermined time intervals. For example the cutoff frequency can be switched from 1.4 MHz to 100 kHz after 20 samples, 100 kHz to 10 kHz after the next 20 samples, 10 kHz to 4 kHz after the next 60 samples, and 4 kHz after the next 100 samples. The time increment increases as the cutoff frequency decreases to compensate for the increase in settling time. The gear mechanism 260 may be triggered by a triggering mechanism to begin operation of the DC notch gear filter 230 when a DC offset is injected into the ADC output.

One possible triggering mechanism is initialization of the receiver when the receiver is turned on or exits from compressed mode. The initialization may be detected by monitoring for a WCDMA Rx Start (WRS) configuration message. Another possible triggering mechanism is an analog gain stage change in the front end processing unit. This may be detected by monitoring for a $T_{BW\_fast}$ from a 3G.4G Rx AGC block. Other trigger mechanisms may also be used. By triggering the gear mechanism only when a DC offset is likely to occur, the operation of the DC notch gear filter may be limited to those times when it is needed to compensate for a DC offset.

The number cutoff frequencies in the sequence and the bandwidth of cutoff frequencies may be selected depending on operational characteristics of the front end processing unit (110, FIG. 1) and/or environmental factors. For example, the cutoff frequencies may be: 1.4 MHz, 100 kHz, 10 kHz, 4 kHz, and 300 Hz. Any number of cutoff frequencies may be selected, depending on a tradeoff between DC notch gear filter complexity and performance. Cutoff frequencies between 0.3 kHz and 1.4 MHz are suitable for many applications. The gear mechanism 260 may be programmable so that the values of cutoff frequencies may be selected when the receiver is installed in a device. To facilitate programmability, a variety of gear mechanism filter settings may be stored so that the desired setting may be easily selected for a given application.

The DC notch gear filter 230 also includes a DC estimator 270 that estimates a DC offset in the input signal (e.g., ADC output from front end processing unit 110, FIG. 1). The DC offset is estimated based, at least in part, on the output of the high pass filter 250. As the cutoff frequency is changed, additional estimated DC offsets are added to the current DC offset by the DC estimator 270. This accumulated estimated DC offset is subtracted from the input signal by a DC compensator 280. The input signal, reduced by the estimated DC offset, is processed by the high pass filter 250, and so on until the sequence of cutoff frequencies has been performed. As the high pass filter 250 and DC compensator 280 operate on the input signal, the effects of the DC offset in the output signal are incrementally reduced.

Figure 3:
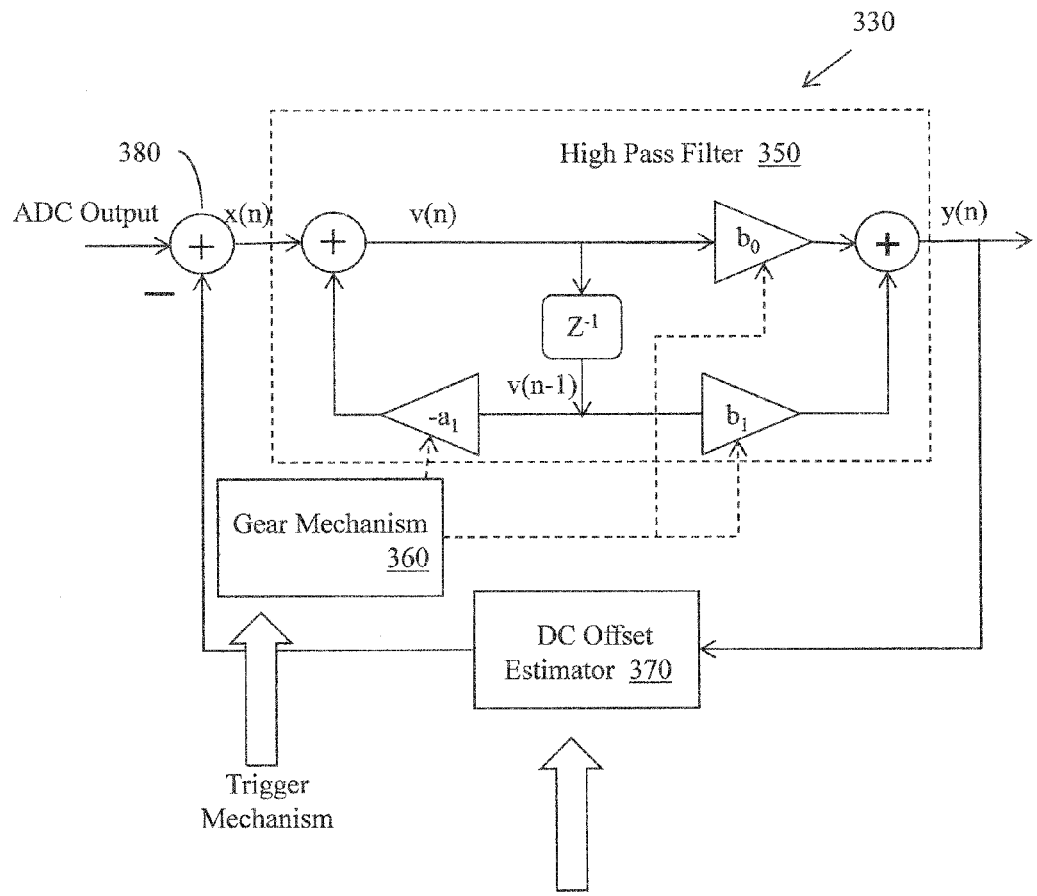
FIG. 3 illustrates one embodiment of a DC notch gear filter for wideband receivers and depicts components that implement the embodiment of the DC notch gear filter.

FIG. 3 illustrates one embodiment of an implementation of the DC notch gear filter of FIGS. 1 and 2. The DC notch gear filter 330 includes a high pass filter 350 implemented using three multiplicative elements $a_1$, $b_0$, and $b_1$, a delay element $z^{-1}$, and two summing elements. The transfer function H(z) of the high pass filter 350 is as follows:

$$H(z)=(b_0+b_1z^{-1})/(1+a_1z^{-1})$$

The cutoff frequency of the high pass filter 350 is determined by the multiplicative values of the coefficients $a_1$, $b_0$, and $b_1$. The gear mechanism 360 changes the multiplicative values to change the cutoff frequency. The gear mechanism may access a look up table that maps sets of coefficients to cutoff frequencies to select the multiplicative values that yield a desired cutoff frequency.

The input to the high pass filter 350 is produced by a DC offset compensator 380. The DC offset compensator 380 subtracts a DC offset estimate produced by a DC offset estimator 370 from the ADC output to produce the signal x(n) that is input to the high pass filter 250. The output of the high pass filter 250 is y(n), which can be expressed as $b_0v(n)+b_1v(n-1)$. (The signal v(n) can be expressed as $x(n)+a_1v(n-1)$.)

The DC offset estimator 370 estimates the DC offset remaining in the input signal x(n) based on the output y(n) of the high pass filter 350.

The DC offset estimator 370 accumulates DC offset values from prior cutoff frequencies as shown in the equations in FIG. 3. Prior to triggering, the DC offset is zero. After trigger, and prior to time $T_1$, feed-forward and feed-back buffers are filled with samples. At time $T_1$, the feed-forward and feedback buffers are zeroed to avoid overshoot transients when the cutoff frequencies are changed and the cutoff frequency is set to the first cutoff frequency (e.g., 1.4 MHz). At time $T_2$, the DC offset estimator estimates the DC offset as $x(T_2)-y(T_2)$. This quantity is subtracted from the ADC output, and the result is input to the high pass filter. At time $T_3$, the cutoff frequency is set to the second cutoff frequency and the DC offset estimator adds $x(T_3)-y(T_3)$ to the estimate at $T_2$. This process is repeated, as shown in FIG. 3, until time $T_6$. At time $T_6$, a final estimate of the DC offset is produced, which when subtracted from the ADC output will result in an accurate output signal y(n). At this time, operation of the DC notch gear filter may be suspended until a next triggering incident.

In one embodiment, the final estimate of the DC offset caused by a change between two given gain stages may be saved in a lookup table. The next time the a shift between the two given gain stages occurs, the final DC offset may be retrieved and subtracted from the ADC output, without needing to reactivate the gear notch filter 330.

Figure 4:
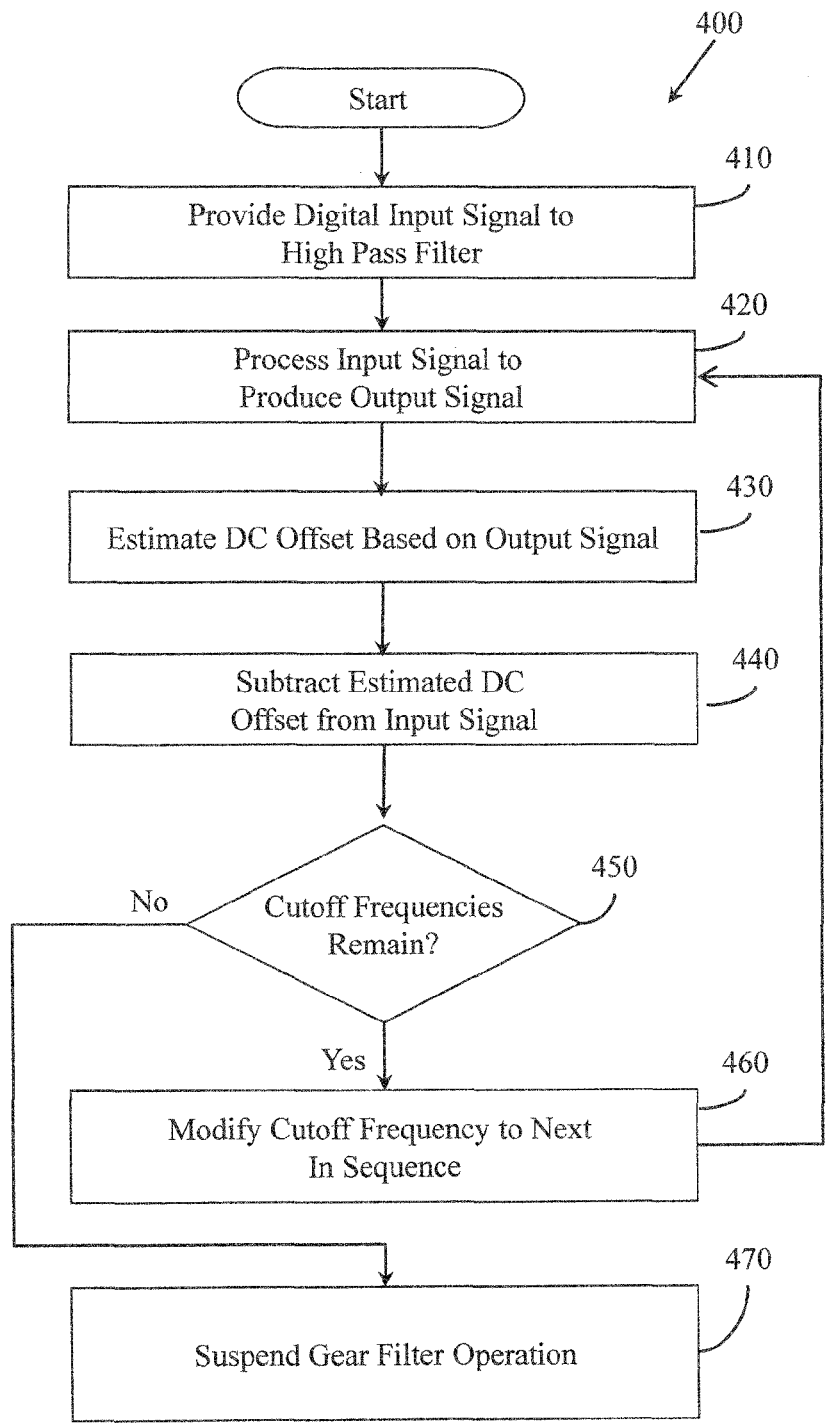
FIG. 4 illustrates one embodiment of a method associated with a direct current (DC) notch gear filter for wideband receivers.

FIG. 4 illustrates one embodiment of a method 400 for operating a DC notch gear filter. The method includes, at 410, providing a digital input signal to a high pass filter. At 420, the method includes processing the input signal with the high pass filter to produce an output signal. The method includes, at 430, estimating a DC offset based on the output signal. At 440, the method includes subtracting the estimated DC offset from the input signal. At 450, a determination is made as to whether additional cutoff frequencies remain in the sequence of cutoff frequencies. If not, at 470, operation of the DC notch gear filter is suspended. If another cutoff frequency remains, the method includes, at 460, changing the cutoff frequency to the next cutoff frequency and looping back to 420. The method continues until no cutoff frequencies remain in the sequence of cutoff frequencies.

In one embodiment, the method is performed in response to detecting a trigger condition associated with a shift in DC offset in a digital signal. The trigger may be an analog gain change in a front end processor that provides the input signal and/or initialization of a front end processor that provides the input signal.

In one embodiment, modifying the cutoff frequency is performed by modifying multiplicative values of multiplier elements in the high pass filter to successively change the cutoff frequency of the high pass filter according to a predetermined sequence of the first, second, and third cutoff frequencies.

In one embodiment, the first cutoff frequency is higher than the second cutoff frequency which is higher than the third cutoff frequency. In one embodiment, the steps of modifying the first and second cutoff frequencies are performed at predetermined time intervals.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus comprising:
a digital high pass filter having a cutoff frequency;
a gear mechanism configured to successively change the cutoff frequency of the high pass filter based on a sequence of cutoff frequencies, wherein the sequence of cutoff frequencies includes a first cutoff frequency, a second cutoff frequency, and a third cutoff frequency, further wherein the first cutoff frequency is different from the second cutoff frequency and the third cutoff frequency and the second cutoff frequency is different from the third cutoff frequency;
a direct current (DC) estimator configured to estimate a first DC offset of a first digital input signal to the high pass filter based, at least in part, on an output signal of the high pass filter operating with the first cutoff frequency;

a direct current (DC) compensator configured to subtract the first DC offset from the first digital input signal to the high pass filter to produce a second digital input signal;

wherein the DC estimator is further configured to estimate a second DC offset of the second digital input signal to the high pass filter based, at least in part, on the output signal of the high pass filter operating with the second cutoff frequency;

wherein the DC compensator is further configured to subtract the second DC offset from the second digital input signal to the high pass filter to produce a third digital input signal;

wherein the DC estimator is further configured to estimate a third DC offset of the third digital input signal to the high pass filter based, at least in part, on the output signal of the high pass filter operating with the third cutoff frequency; and wherein the DC compensator is further configured to subtract the third DC offset from the third input signal to the high pass filter.

2. The apparatus of claim 1, wherein:

the digital high pass filter comprises a plurality of multiplier elements that act upon the input and output signals of the high pass filter to set the cutoff frequency of the high pass filter; and the gear mechanism is configured to selectively modify multiplicative values of the multiplier elements to successively change the cutoff frequency of the high pass filter according to a predetermined sequence of at least three different cutoff frequencies.

3. The apparatus of claim 2, wherein the gear mechanism retrieves the multiplicative values from a non-transitory storage medium that stores multiplicative values in sets, wherein a set of multiplicative values is associated with a cutoff frequency produced by the multiplicative values in the set.

4. The apparatus of claim 1, wherein the gear mechanism is configured to modify the cutoff frequency such that the cutoff frequency decreases in each successive modification.

5. The apparatus of claim 1, comprising a trigger mechanism configured to selectively activate the gear mechanism when predetermined criteria are met, wherein the predetermined criteria correspond to operating conditions that cause a DC offset in the input signal.

6. The apparatus of claim 5, wherein the trigger mechanism is configured to selectively activate the gear mechanism when an analog gain change occurs in a front end processor that provides the input signal.

7. The apparatus of claim 5, wherein the trigger mechanism is configured to selectively activate the gear mechanism when a front end processor that provides the input signal is initialized.

8. The apparatus of claim 1, wherein the DC estimator is configured to, prior to changing to a next cutoff frequency in the sequence, add a signal corresponding to the output of the high pass filter to the DC offset to produce a next DC offset.

9. The apparatus of claim 1, wherein the gear mechanism is configured to change the cutoff frequency at predetermined time intervals.

10. A method, comprising:

processing an input signal with a high pass filter operating with a first cutoff frequency to produce a first output signal;

estimating a first DC offset as substantially equal to the first output signal;

subtracting the first DC offset from the input signal to produce a second input signal to the high pass filter;

modifying the first cutoff frequency to a second cutoff frequency;

processing the second input signal with the high pass filter to produce a second output signal;

estimating a second DC offset as substantially equal to a sum of the second output signal and the first DC offset;

subtracting the second DC offset from the input signal to produce a third input signal to the high pass filter;

modifying the second cutoff frequency to a third cutoff frequency;

processing the third input signal with the high pass filter to produce a third output signal; and wherein the first cutoff frequency is different from the second cutoff frequency and the third cutoff frequency and the second cutoff frequency is different from the third cutoff frequency.

11. The method claim 10, further comprising performing the method in response to detecting a trigger condition associated with a DC offset in a digital signal.

12. The method of claim 11, wherein the trigger comprises i) an analog gain change in a front end processor that provides the input signal or ii) initialization of the front end processor that provides the input signal.

13. The method of claim 10, wherein modifying the cutoff frequency is performed by modifying multiplicative values of multiplier elements in the high pass filter to successively change the cutoff frequency of the high pass filter according to a predetermined sequence of the first, second, and third cutoff frequencies.

14. The method of claim 10 wherein the first cutoff frequency is higher than the second cutoff frequency which is higher than the third cutoff frequency.

15. The method of claim 10 wherein the modifying of the cutoff frequency to the first cutoff frequency and the second cutoff frequency are performed at predetermined time intervals.

16. An RF receiver comprising:

a front end processor comprising:

a plurality of gain stages configured to amplify a received signal, wherein a gain stage is selected from the plurality of gain stages to process a received signal based on strength of the received signal, and wherein when a different gain stage is selected, a DC offset is produced in a signal output by the gain stage; and an analog to digital converter (ADC) configured to convert an output of the gain stages into a digital signal;

a DC notch gear filter configured to remove the DC offset by:

processing an input digital signal with a high pass filter operating with a first cutoff frequency to produce a first output signal;

estimating a first DC offset as substantially equal to the first output signal;

subtracting the first DC offset from the input signal to produce a second input signal to the high pass filter;

modifying the first cutoff frequency to a second cutoff frequency;

processing the second input signal with the high pass filter to produce a second output signal;

estimating a second DC offset as substantially equal to a sum of the second output signal and the first DC offset;

subtracting the second DC offset from the input signal to produce a third input signal to the high pass filter;

modifying the second cutoff frequency to a third cutoff frequency;

processing the third input signal with the high pass filter to produce a third output signal;

wherein the first cutoff frequency is different from the second cutoff frequency and the third cutoff frequency and the second cutoff frequency is different from the third cutoff frequency; and a baseband processor configured to perform baseband processing on an output of the DC notch gear filter.

17. The RF receiver of claim 16 further comprising non-transitory storage media that stores multiplicative values in sets, wherein a set of multiplicative values is associated with a given cutoff frequency produced by the multiplicative values in the set, and further wherein the multiplicative values are assigned to multiplier elements in the high pass filter to produce the given cutoff frequency.

18. The RF receiver of claim 17 further comprising a cutoff frequency selector configured to select a subset of the sets of multiplicative values for use by the DC notch gear filter.

19. The RF receiver of claim 16 further comprising a trigger mechanism configured to selectively activate the DC notch gear filter when an analog gain change occurs in the front end processor.

* * * * *